United States Patent Office 2,967,128
Patented Jan. 3, 1961

2,967,128
BIRD REPELLENT

Morley R. Kare, Ithaca, N.Y., assignor to S. B. Penick and Company, Incorporated, New York, N.Y., a corporation of Delaware No Drawing. Filed June 6, 1957, Ser. No. 663,887

10 Claims. (Cl. 167—46)

This invention relates to a process for repelling birds from eating bird edibles by treating the bird edibles so as to render them unattractive i.e., bad-tasting to birds and to certain compositions useful in this process. As used herein "birds" are members of the class "Aves." Birds, both domestic and wild, such as chickens, turkeys, ducks, pheasants, crows, et cetera cause much damage and economic loss by eating newly planted seeds, ripening grain crops, stored corn, berries, fruits, et cetera. Certain birds, particularly poultry, e.g., chickens, are cannibalistic by nature and peck at each other, causing injury and sometimes killing each other. Many methods of preventing birds from causing such destruction without injury to the birds themselves have been tried, but few, if any, have proved commercially satisfactory.

I have found that birds have a definite sense of taste which interprets and responds to flavors differently than that of humans, and that many flavors considered pleasant by humans are rejected by birds and vice versa. When any of the repellent flavor compounds discussed hereinafter are applied to the external surface of foods which birds normally like, e.g. corn, and birds are given a choice between foods so flavored, and unflavored foods, the birds will prefer the unflavored foods. Where birds are not given anything but the flavored foods to eat, they will (depending on the amount of repellent flavor employed) likely ultimately consume even the flavored foods, much as humans will ultimately eat foods they intensely dislike rather than starve.

The object of the present invention is to provide a successful method for preventing such damage by treating the bird edibles with a solution, suspension, emulsion, or other type of formulation having as its essential active repellent ingredient one or more members of the following classes or organic compounds: esters of anthranilic acid, esters of phenylacetic acid, and dimethyl benzyl carbinyl acetate.

The repellent flavor compounds used in the present invention are, surprisingly, flavors considered pleasant by humans to the extent that they have been used in formulating artificial food flavors used in baking and cooking.

Anthranilic acid is ortho amino-benzoic acid. The optimum preferred ester for the present invention is dimethyl anthranilate (methyl ortho-N-methylaminobenzoate) which has very excellent repellent action for prolonged periods in very small concentrations. A wide variety of ester moieties of anthranilic acid have been found to have some repellent action. Among the anthranilates included within the present invention are for example: ethyl anthranilate, phenyl ethyl anthranilate, methyl anthranilate and menthyl anthranilate (listed in decreasing order of effectiveness). Indications are that alkyl substitution in the amino group increases repellent effectiveness and that increasing the molecular weight of the anthranilate above that of dimethyl anthranilate tends to decrease the repellent effect. Another apparent factor is solubility, those anthranilates which are least soluble in water and which are very soluble in common organic solvents (alcohol, ethers, glycols, et cetera) being usually preferred as bird repellents.

Esters of phenyl acetic acid tested include such wide varieties of ester moieties as alkyls, alkenyls, aryls, aralkyl, et cetera. The alkyl phenyl acetates have good repellent action with the repellent effect decreasing as the number of carbons in the alkyl decreases. Thus methyl phenyl acetate, ethyl phenyl acetate and isobutyl phenyl acetate are relatively good repellents, butyl phenyl acetate and amyl phenyl acetate are only fair repellents, and extension of the alkyl chain to 15 as in santalyl phenyl acetate results in poor (albeit some) repellent effect. The same appears to apply to unsaturated straight chains, which on the whole are not quite as good repellents as their alkyl analogues. Thus, amyl phenyl acetate has a fair repellent effect, while geranyl phenyl acetate and rhodinyl phenyl acetate are less effective repellents. Among the aryl and aralkyl phenyl acetates, substituents on the ring and longer alkyl chains appear to decrease the repellent effectiveness. Thus while benzyl phenyl acetate has very effective repellent action, p-cresyl phenyl acetate has good repellent action, m-cresyl phenyl acetate has less repellent action and isoeugenol phenyl acetate has comparatively little repellent effect. Phenyl ethyl phenyl actuate has fair repellent action.

Dimethyl benzyl carbinyl acetate also has very good repellent action.

The bird repellent effectiveness of the various repellent flavor compounds is directly proportional to the concentration of the repellent compound applied to the bird edibles. The repellent flavor compounds useful in the process of the present invention naturally do not retain their effectiveness as a bird repellent when applied in too small a concentration although some are effective at much smaller concentrations than others. But even those repellent flavor compounds which are described as "poor" are most effective when applied in high concentration, and comparison of effectiveness of the various flavor compounds is directed more to showing which are better repellents when used in more economically feasible low concentrations. It is to be understood that there is a large concentration range of effective repellent effect, so that the specific concentrations shown in the various examples throughout the specification are to be regarded as illustrative only and not limiting.

Other objects of the invention will become apparent from the specification.

As an example of the effectiveness of my process, large plots of growing corn (near harvest time) were sprayed with dilute solutions of the repellent flavor compounds and the number of ears of corn damaged by wild birds over a twelve day period was 72 percent less than the number of ears of corn damaged in a contiguous identical control plot of corn.

When the recellent flavor compounds are liquids, they can be applied undiluted to the bird edibles to be protected. However, since only small amounts of repellent flavor compound need be applied to the bird edibles to be protected, to give adequate bird repellent effect, a carrier is employed to facilitate application. The carrier can be a solid or liquid carrier. Solid carriers e.g., finely divided inert powders such as talc and the like, have the repellent flavor compounds absorbed thereon, and are applied as a dust.

It is envisioned that liquid carriers having the repellent flavor compounds dispersed therein will prove to be of more popular use. Each of the repellent flavor compounds is substantially insoluble in water, and is soluble in most organic solvents. Thus, the repellent flavor compounds or combinations thereof can be applied dissolved in an organic solvent. Water can be used as the major portion of the liquid carrier forming a suspension or emulsion of the repellent flavor by the use of small amounts of an emulsifying agent, or a gum such as gum acacia, gum tragacanth, etc. Among the emulsifying agents which may be used are, for example, the "Tweens" and "Spans" which are polyoxyalkylene derivatives of hexitol anhydride partial long chain fatty acid esters, especially polyoxyethylene sorbitan monolaurate ("Tween 20"); monostearate ("Tween 60"); tristearate ("Tween 65"); monooleate ("Tween 80"). A water solution of the repellent flavor compounds can also be prepared by the use of a suitable co-solvent, i.e., an organic solvent which will dissolve the repellent flavor compounds and which is freely miscible with water. By use of a liquid carrier, the repellent flavor compounds can easily be applied to the bird edibles to be protected in the form of a spray, either from a hand or machine operated spray apparatus, or even from a propellent operated "aerosol" pressure container. Other forms of application e.g. by sprinkling, soaking, etc., could of course, also be used. The organic solvent to be used may differ according to the ultimate use of the repellent flavor compounds. For example, where the bird repellent is to be applied to growing crops, solvents which might damage the crops in any way will be avoided. Where the bird repellent is to be applied to nests, to prevent birds from returning to their nests, then any organic solvent may be used. For many uses the solvent should be non-toxic in the amounts used, except that where the solvent evaporates relatively quickly without itself leaving any residue, toxicity is not a real factor.

For various uses, it is desirable to incorporate a material such as gum acacia, etc., with the repellent flavor compounds so that the repellent flavor compound will better adhere to the surface it is to be applied to.

The organic solvents themselves may have a flavor which attracts, repels, or is neutral to birds. Often a solvent which is itself a repellent flavor masks the repellent action of the repellent flavor compounds so that a less effective composition results. It is preferred to use a solvent which is itself relatively neutral to the taste of birds, so as not to hamper the effectiveness of the listed repellent flavor compounds. Propylene glycol is the preferred solvent. If the solvent used evaporates relatively quickly without leaving any residue, e.g. alcohols, ethers, etc., then the taste of the solvent becomes relatively unimportant.

Certain of the repellent flavor compounds and combinations thereof were initially tested with a series of test groups of about 20 one-day old chicks in each test group during a series of 14–21 days' test period. These test groups were given a free choice of equal amounts of water and flavored water under carefully controlled conditions designed to eliminate all influences except taste on the amount of flavored water consumed. The fowl's intake of water and of repellent compound flavored water was carefully measured. The results of the tests were expressed in terms of acceptance percentage, i.e., the percent of the total fluid intake which the flavored water intake constituted. To illustrate, if the fowl were offered 1 liter of water and 1 liter of flavored water, and if at the end of the test period they had consumed 500 milliliters of water and 200 milliliters of flavored water, then the percentage acceptance would be 200/700 or about 28.6 percent. The larger the percentage acceptance, the less the repellent effect of the flavor. A percentage acceptance of 50 percent would indicate that, the fowl liked the flavored water equally as well as the unflavored water or were not stimulated by the flavor. The smaller the percentage acceptance, the greater the repellent effect of the flavor.

The following chart illustrates some of the typical results obtained. Concentration is expressed in terms of parts per thousand parts of the total aqueous solution. Thus, a concentration of 0.04 is four-hundredths parts per thousand parts of the total aqueous solution. Percentage is acceptance percentage.

*Ingredients*

[Concentration of ingredients in parts per thousand]

| Ingredient: | | | | | | | | | | | | | | |
|---|---|---|---|---|---|---|---|---|---|---|---|---|---|---|
| dimethyl anthranilate | .04 | | .05 | | .0025 | .0025 | 0.4 | .04 | .04 | 1 | | | | |
| methyl phenyl acetate | | .05 | | | .04 | .04 | .64 | .04 | .64 | | | 1 | | |
| dimethyl benzyl carbinyl acetate | | | | .05 | | .0025 | .04 | | | | | | 1 | |
| ethyl phenyl acetate | | | | | | | | | | | 1 | | | |
| allyl phenyl acetate | | | | | .2775 | .275 | 4.4 | 5.0 | 4.4 | | | | | |
| propylene glycol | 5.1 | | | | | | | | | .0025 | .0025 | .0025 | .0025 | .0025 |
| "Tween 20" | | .005 | .005 | .005 | | | | | | 4.1 | 12.0 | 5.7 | 5.7 | 6.7 |
| Acceptance Percentage | 28.0 | 33.9 | 8.0 | 40.4 | 40.7 | 30.3 | 5.7 | 25.4 | 6.2 | | | | | |

The test data shows that each of the listed ingredients has a high degree of repellent action to birds in drinking water at a concentration of 1 part per thousand, the percentage acceptance ranging from a low of 4.1 percent acceptance for dimethyl anthranilate to 12.8 percent acceptance for allyl phenyl actate. Dimethyl anthranilate was a respectfully effective repellent even at a concentration of 1 part per 25,000 of water, and is the most effective of the above listed compounds, with methyl phenyl acetate, dimethyl benzyl carbinyl acetate, ethyl phenyl acetate and allyl phenyl acetate being successively less effective when used as the sole active repellent ingredient.

When the above listed compounds are used in combination, the effect is usually not quite additive, but there is sufficient effect to warrant combining major amounts of the cheapest compound, methyl phenyl acetate, with minor amounts of the more expensive compounds.

When the repellent compositions of one or more of the compounds dissolved in an organic solvent and diluted with water are actually used by the farmer, the concentrations of the active ingredients are necessarily much higher than in the drinking water tests, since seeds, crops, berries, et cetera do not permit as great a degree of flavor discrimination as does drinking water which has no taste of its own. Another reason for this is the birds have relatively little saliva and taste is a molecular phenomenon, which means that a flavor or food must go into solution to be "tasted." Where the material to be treated is "juicy" e.g. a berry, less repellent flavor is required than where the material is very dry. As a general rule of thumb, seeds, et cetera will have to be treated with 50 times the concentrations used in the drinking water tests to obtain correlative repellent effectiveness. The drinking water test data has been shown by field tests with treated seeds, feeds, growing crops, et cetera, to bear a direct correlation as to relative effectiveness of various compounds and combinations of compounds with the field tests data.

Thus, a series of field tests were run in which various varities of fowl in test groups of five were offered equal amounts of various unflavored feeds (such as mixed cereal grains, corn, cracked wheat, etc.) and identical feeds flavored with the repellent flavor compounds, under carefully controlled conditions extending over 2–3 week periods. The various repellent flavor compounds were formulated in solutions of a small amount of ethyl alcohol and water and sprayed on the external surface of the feeds to be flavored so that 1 milliliter of the active repellent compound was distributed substantially equally over 100 grams of feed. The results of these tests are stated in terms of acceptance percentage of flavored feed (as explained above). Some of the typical results were: dimethyl anthranilate, 1.5 percent; methyl phenyl acetate, 14.2 percent; ethyl phenyl acetate, 31.0 percent; and, ethyl anthranilate 9.9 percent.

In another typical and severe test of the effectiveness of the various repellent flavor compounds, solutions of the various repellents were made up (using ethyl alcohol, propylene glycol, and gum acacia as the carriers) and were sprayed on poultry feed so that 1 milliliter of active repellent flavor compound was distributed substantially equally over 100 grams of feed. The flavored feed was exposed for about 2 weeks before being used in the tests which extended over a 2 week period. Groups of five baby chickens (five weeks old) were offered equal amounts of flavored and unflavored feed under controlled conditions, with results, stated in terms of percentage acceptance of flavored feed, as follows:

|  | Percent |
| --- | --- |
| Butyl phenyl acetate | 26 |
| Isobutyl phenyl acetate | 19 |
| Allyl phenyl acetate | 30 |
| Amyl phenyl acetate | 23 |
| Benzyl phenyl acetate | 15 |
| Meta cresyl phenyl acetate | 38 |
| Para cresyl phenyl acetate | 22 |
| Isoeugenol phenyl acetate | 45 |
| Geranyl phenyl acetate | 30 |
| Rhodinyl phenyl acetate | 32 |
| Santalyl phenyl acetate | 41 |
| Phenylethyl phenyl acetate | 16 |
| Methyl anthranilate | 33 |
| Menthyl anthranilate | 30 |
| Phenyl ethyl anthranilate | 27 |

It has been found out that about one out of every twenty chickens is "taste-blind" so there is a chance that some of the above acceptance percentages are even lower.

Other tests were conducted which showed that the data accumulated on chickens was directly applicable to other domestic birds e.g. turkeys, pheasants, et cetera and to wild birds e.g. starlings, sparrows, crows, et cetera, although the minimum effective repellent concentrations differed slightly.

In actual commercial practice, it is envisioned that combinations of the more effective repellent flavor compounds will likely be used and that small amounts of dimethyl anthranilate will be formulated with some of the less expensive repellent compounds (other effective repellents which may also be used are described in my co-pending application Serial Number 663,886, filed even date herewith entitled, "Bird Repellent Process" and include geraniol, ceromel, oil of celery seed, and others) and a concentrate prepared using an organic solvent and/or an emulsifying agent. This concentrate will be diluted with water and dispensed as a spray for use on growing crops. For spraying seeds or other applications where smaller total amounts of repellents are required, the repellents can be packaged in "aerosol" propellent-containing pressure containers.

As another example of concentrations more likely to be used in actual practice and their effectiveness, field tests in which pheasants were offered pelletized feed sprays with a solution of 1 part of dimethyl anthranilate, 20 parts of propylene glycol and 130 parts of water [the solution was sprayed on the feed using 4 cubic centimeters of repellent solution per pound of feed], and a free choice of equal quantities of identical but unflavored feed under carefully controlled conditions, designed to remove all influences but taste on the choice of what feeds were eaten, resulted in the consumption of 17 times as much untreated feed as treated feed.

The compounds used as repellent flavorings are not toxic to birds and warm blooded animals in the amounts which will actually be used.

The repellents of the present invention, especially dimethyl anthranilate, seem to exhibit an unique repellency selectivity in that while use of the repellents on animal feeds renders the feed unattractive to birds, the flavored feeds are still readily accepted by non-birds e.g. cattle, rats and insects. Thus cattle feed can be protected from birds, and poisoned feed to eliminate rats can be treated to ensure their non-consumption in deleterious amounts by birds.

To illustrate another aplication of mpy process, various formulations of one or more of the repellent flavor compounds were made up and tested as a spray (both hand spray and "Freon" propellent aerosal spray) for use as an anti-picking agent to prevent cannibalism (which is used herein to include "picking" and "feather pulling") in birds (especially chickens, turkeys and pheasants) without the need for debeaking or other conventional anti-picking methods. In one test a flock of almost 800 seven month old chickens (that had been affected with "pick-out" and "blowouts" for a five week period during which over a hundred birds had died and in which the mortality rate was climbing to 10 birds per day) was sprayed with a formulation containing 0.78 percent dimethyl anthranilate, 12.5 percent methyl phenyl acetate and the balance propylene glycol, mortality dropped immediately and within several days there were no further losses, and those birds which had been injured were healing.

In another test, a flock of 590 pullets, age ten weeks, and that had full beaks, had started to pick and pull feathers some two weeks before, and in which a number of the birds were picked about the tail and bleeding, were sprayed. Two formulations were used, each being used on half the birds. The formulations were dispersed from self-contained propellent pressure-operated aerosol containers, one formulation containing in terms of percent by weight 0.17 dimethyl anthranilate, 59.8 isopropyl alcohol and 40.0 "Freon" propellent (half "Freon 11" and half "Freon 12"), and the other containing 0.13 dimethyl anthranilate, 3.33 methyl phenyl acetate, 57.3 isopropyl alcohol with the balance "Freon" propellent. It was found that a 12 ounce can was sufficient to spray 150 birds when used at the rate of two seconds of spraying per bird, and that this amount of spray gave good coverage of areas needing protection. Several days later, inspection revealed no further picking on the injured birds and no new victims. Where the above formulations were used at the rate of five seconds of spraying per bird, there was no further picking even after several weeks.

In another test some 250 birds (Mt. Hope strain) were treated by being sprayed with a formulation consisting of, in terms of parts by weight: 2.0 dimethyl anthranilate, 78.0 propylene glycol, 2.0 gum arabic and 18.0 water (one-half pint being used to spray 250 birds, using a hand pump). Before treatment the ten month old birds were in poor condition, pickouts and prolapses were occuring at the rate of 2 to 3 per day, and some 30 birds had died in the ten days previous to treatment. Three days after being sprayed, only one case of further bleeding was evident.

The above tests are representative of a series of tests in which the listed repellents and combinations thereof (in amounts ranging from as little as 0.78 to about 25 percent by weight of the total formulation) were sprayed on injured birds. Results showed excellent effectiveness as anti-picking agents and also excellent residual effect.

To illustrate other related uses of the repellent flavor compounds, after the walls of chicken houses (made of "Celotex," a structural insulation fiber board made from sugar cane fiber) were sprayed with formulations containing the repellent flavor compounds, the chickens no longer pecked at the walls.

In another series of tests, various formulations of the repellent flavor compounds were sprayed on nests. The birds inhabiting these nests quickly destroyed them and did not rebuild their nests in the same area.

When telephone wires normally used as a roost by sparrows and starlings were sprayed with a formulation containing the repellent flavor compounds, they refused to roost on the wires for about two weeks. When the repellent flavor compounds are formulated for use in preventing birds from roosting on wires, roofs, etc., it is preferred to incorporate a gel therewith.

All of the above uses, and related uses depend on the birds "tasting" the repellent flavor. Where birds roost on a surface, they normally peck at the surface, or clean their feet with their beaks, thus becoming aware of the repellent flavor.

To illustrate some of the formulations that have been successfully tested for one or more of the uses discussed throughout this specification:

(A) A concentrate is prepared from 50 percent by weight of dimethyl anthranilate and 50 percent of "Tween 80." This concentrate is then diluted with water (the amount of dilution will depend on the type of spray equipment used) and well agitated before use. This formulation is applied to growing crops and seedlings so that 0.5 to 2.0 cc. of concentrate are sprayed per 10 square feet. When the diluted formulation is used as a spray on seeds which are to be planted, 5 cc. of the concentrate is used per pound of seed.

(B) A concentrate is prepared from 45 percent by weight of dimethyl anthranilate, 5 percent by weight of geraniol and the balance "Tween 80." This concentrate is then diluted with nine parts of water, resulting in a formulation containing 5 percent active repellent ingredients. When used as an anti-picking agent, it is preferred to first remove picked birds from the flock, and spray their injured areas at the rate of 1-5 cc. per bird. Then the picked birds are returned to the flock and the entire flock is sprayed while roosting using one quart of the above formulation per 500 birds.

(C) Other typical concentrate formulations which can be used as above include, in terms of parts by weight:

| | | | | |
|---|---|---|---|---|
| dimethyl anthranilate | 0.78 | 12.50 | 0.78 | |
| methyl phenyl acetate | 12.50 | 1.25 | 12.5 | 7.5 |
| geraniol | 0.78 | 6.25 | 0.78 | |
| dimethyl benzyl carbinyl acetate | 0.78 | 1.25 | | |
| allyl phenyl acetate | | | 0.78 | |
| ceromel | | | 3.12 | |
| oil of celery seed | | | 1.56 | |
| ethyl phenyl acetate | | | 6.25 | |
| propylene glycol | 75.16 | 78.80 | 74.23 | 87.5 |
| gum arabic | | | | 0.5 |
| water | | | | 4.5 |

The repellent flavor compounds, or combinations thereof, retain a large part of their repellent activity even when applied in combination with materials having little or no repellent activity, and which materials might be thought to "mask" the repellent flavors. Thus the addition of such relatively neutral flavors as vanillin, or fruit flavors such as oil of orange, oil of lemon, etc., to the repellent flavor compounds do not seriously impair the repellent effect on birds, even when used in amounts greater than that of the repellent flavor compounds.

It is to be understood that the invention is not to be limited to the exact details of operation or exact compounds and formulations shown and described, as obvious modifications and equivalents will be apparent to one skilled in the art, and the invention is therefore to be limited only by the scope of the appended claims.

I claim:

1. The process of repelling birds which comprises applying a compound selected from the group consisting of methyl ortho-N-methylaminobenzoate, methyl anthranilate, ethyl anthranilate, phenyl ethyl anthranilate, methyl anthranilate and dimethyl benzyl carbinyl acetate to the material from which said birds are to be repelled.

2. The process of repelling birds which comprises applying a compound selected from the group consisting of methyl ortho-N-methylaminobenzoate, methyl anthranilate, ethyl anthranilate, phenyl ethyl anthranilate, menthyl anthranilate and dimethyl benzyl carbinyl acetate, dispersed in a carrier, to the material from which said birds are to be repelled.

3. The process of repelling birds from eating bird edibles which comprises applying to the external surface of said bird edibles a compound selected from the group consisting of methyl ortho-N-methylaminobenzoate, methyl anthranilate, ethyl anthranilate, phenyl ethyl anthranilate, menthyl anthranilate and dimethyl benzyl carbinyl acetate, dispersed in a carrier.

4. The process of repelling birds from eating birds edibles which comprises applying to the external surface of said bird edibles a repellent liquid formulation having as its essential active repellent ingredient a compound selected from the group consisting of methyl ortho-N-methylaminobenzoate, methyl anthranilate, ethyl anthranilate, phenyl ethyl, anthranilate, menthyl anthranilate and dimethyl benzyl carbinyl acetate.

5. The process of repelling birds from eating bird edibles which comprises applying to the external surface of said bird edibles a repellent liquid formulation having as its essential active repellent ingredient a compound selected from the group consisting of methyl ortho-N-methylaminobenzoate, methyl anthranilate, ethyl anthranilate, phenyl ethyl anthranilate, menthyl anthranilate and dimethyl benzyl carbinyl acetate, dispersed in an organic solvent.

6. The process for protecting seeds, grain, berries, growing crops and the like against being eaten by birds which comprises spraying the external surface of the edible materials to be protected with a repellent liquid formulation containing a small amount of a compound selected from the group consisting of methyl ortho-N-methylaminobenzoate, methyl anthranilate, ethyl anthranilate, phenyl ethyl anthranilate, methyl anthranilate and dimethyl benzyl carbinyl acetate dispersed in an organic solvent.

7. The process for controlling cannibalism in birds which includes applying a liquid dispersion in which is contained a small amount of a compound selected from the group consisting of methyl ortho-N-methylaminobenzoate, methyl anthranilate, ethyl anthranilate, phenyl ethyl anthranilate, menthyl anthranilate, lower alkyl phenyl acetates, lower alkenyl phenyl acetates, benzyl acetate, phenyl ethyl phenyl acetate, p-cresyl phenyl acetate and dimethyl benzyl carbinyl acetate to the exterior surfaces of said birds.

8. The process for controlling cannibalism in poultry which comprises applying to the exterior surfaces of said poultry a compound selected from the group consisting of methyl ortho-N-methylaminobenzoate, methyl anthranilate, ethyl anthranilate, phenyl ethyl anthranilate, lower-alkyl phenyl acetates, benzyl phenyl acetate, and dimethyl benzyl carbinyl acetate.

9. The process for treating bird edibles to render them unattractive to birds which comprises applying to the external surfaces of said bird edibles a repellent liquid dispersion having as its essential active repellent ingredient methyl ortho-N-methylaminobenzoate.

10. The process for treating bird edibles to render them unattractive to birds which comprises applying to the external surfaces of said bird edibles a repellent liquid dispersion having as its essential active repellent ingredient ethyl anthranilate.

References Cited in the file of this patent

UNITED STATES PATENTS

| | | |
|---|---|---|
| 1,877,676 | Lockwood | Sept. 13, 1932 |
| 2,204,213 | Grace | June 11, 1940 |
| 2,381,411 | Remensnyder | Aug. 7, 1945 |
| 2,392,518 | Barnhill | Jan. 8, 1946 |

OTHER REFERENCES

Bellack et al.: Relationship Between Chemical Structure and Rat Repellency, Natl. Res. Council, May 8, 1953, pp. 49, 58, 60 and 90 relied upon.

UNITED STATES PATENT OFFICE
CERTIFICATION OF CORRECTION

Patent No. 2,967,128            January 3, 1961

Morley R. Kare

It is hereby certified that error appears in the above numbered patent requiring correction and that the said Letters Patent should read as corrected below.

Column 4, line 16, strike out "thousand parts of the total aqueous solution." and insert instead --- thousand, the balance of the solution being ---; column 8, line 58, for "benzyl acetate" read -- benzyl phenyl acetate ---.

Signed and sealed this 5th day of September 1961.

(SEAL)
Attest:

ERNEST W. SWIDER            DAVID L. LADD
Attesting Officer            Commissioner of Patents